(12) United States Patent
Yamamoto et al.

(10) Patent No.: US 9,397,340 B2
(45) Date of Patent: *Jul. 19, 2016

(54) COMPOSITE CARBON FIBERS

(71) Applicant: SHOWA DENKO K.K., Minato-ku, Tokyo (JP)

(72) Inventors: Ryuji Yamamoto, Tokyo (JP); Takeshi Nakamura, Tokyo (JP); Nobuaki Ishii, Tokyo (JP); Yuta Hirano, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 14/047,637

(22) Filed: Oct. 7, 2013

(65) Prior Publication Data
US 2014/0272596 A1    Sep. 18, 2014

(30) Foreign Application Priority Data

Mar. 14, 2013  (JP) ................................. 2013-052103

(51) Int. Cl.
    H01M 4/00     (2006.01)
    H01M 4/62     (2006.01)
    H01M 4/58     (2010.01)
    H01M 10/052   (2010.01)

(52) U.S. Cl.
    CPC ............ *H01M 4/625* (2013.01); *H01M 4/5825* (2013.01); *H01M 10/052* (2013.01)

(58) Field of Classification Search
    CPC .. H01M 4/625; H01M 4/5825; H01M 10/052
    See application file for complete search history.

(56) References Cited

U.S. PATENT DOCUMENTS

| 2011/0163274 | A1 | 7/2011 | Plee et al. |
| 2012/0171566 | A1 | 7/2012 | Yoshitake et al. |
| 2012/0214070 | A1 | 8/2012 | Yamamoto et al. |
| 2013/0089780 | A1* | 4/2013 | Uezono ........................ 429/211 |

FOREIGN PATENT DOCUMENTS

| JP | 2010-238575 A | 10/2010 |
| WO | 2006/137893 A2 | 12/2006 |

OTHER PUBLICATIONS

Extended European Search Report dated Jul. 10, 2014, issued by the European Patent Office in corresponding European application No. 13183757.

* cited by examiner

*Primary Examiner* — Jane Rhee
(74) *Attorney, Agent, or Firm* — Sughrue Mion, PLLC

(57) ABSTRACT

Provided is composite carbon fibers comprising multi-walled carbon nanotubes wherein 99% by number or more of the multi-walled carbon nanotubes have a fiber diameter of not less than 5 nm and not more than 40 nm, carbon particles having a primary particle diameter of not less than 20 nm and not more than 100 nm and graphitized carbon nanofibers wherein 99% by number or more of the graphitized carbon nanofibers have a fiber diameter of not less than 50 nm and not more than 300 nm, wherein the multi-walled carbon nanotubes are homogeneously dispersed between the graphitized carbon nanofibers and the carbon particles.

18 Claims, 7 Drawing Sheets

COMPOSITE CARBON FIBERS

This application claims priority under 35 U.S.C. sect. 119 (a) on Patent Application No. 2013-052103 filed in Japan on Mar. 14, 2013, the entire contents of which are hereby incorporated by references.

TECHNICAL FIELD

The present invention relates to composite carbon fibers. More specifically, the present invention relates to composite carbon fibers which are easily dispersed in a matrix such as resin without leaving aggregates, and have an excellent effect to reduce electric resistance.

BACKGROUND ART

Carbon materials can impart electric conductivity, thermal conductivity and the like on resin materials, coating materials and the like. Moreover, carbon materials are also used as an electrode material for a battery. For these carbon materials, known are carbon nanofibers, carbon nanotubes, carbon black and the like.

Carbon nanofibers have a relatively thick fiber diameter of 50 nm to 300 nm, and a fiber length of about 10 μm (FIG. 1). Such carbon nanofibers show weak entanglement between the fibers, and thus each of the carbon nanofibers can be easily dispersed by adding to a matrix and kneading. However, when trying to sufficiently construct electrically conductive networks by connecting the carbon nanofibers to each other, a large amount of the carbon nanofibers needs to be added.

On the other hand, carbon nanotubes have a thin fiber diameter of 5 nm to 40 nm and a fiber length of 3 μm to 10 μm, showing an aspect ratio of near 1000 (FIG. 2). Such carbon nanotubes show entanglement between the fibers to form aggregates of several hundred micrometers (FIG. 3). When the aggregates of such strongly entangled carbon nanotubes is added to a matrix and kneaded, the aggregates only become finer, and the structure of the aggregates still remains. Therefore, it is difficult to achieve a state in which each of the carbon nanotubes is untangled. As a result, an electric conductivity imparting effect may not be as good as expected.

Further, carbon blacks represent particles having a primary particle diameter of several nanometers to several tens of nanometers. The carbon blacks form a secondary structure called "STRUCTURE" in which primary particles are lined up. This STRUCTURE usually has a line-up length of as short as about 100 nm. The STRUCTURES can be relatively easily dispersed because they are not firmly aggregated.

CITATION LIST

Patent Literature

Patent Literature 1: JP 4835881 B

SUMMARY OF INVENTION

Technical Problem

Proposed is a combined use of carbon nanofibers and carbon nanotubes in order to compensate for the disadvantages and to utilize the advantages of the carbon nanofibers and the carbon nanotubes.

For example, Patent Literature 1 discloses an electrode for a lithium ion battery comprising fibrous carbons having a diameter of less than 100 nm and fibrous carbons having a diameter of not less than 100 nm, and/or electrically conductive nonfibrous carbons as electrically conductive material. However, the electric conductivity obtained was not as good as expected. When fibrous carbons having a diameter of less than 100 nm was dispersed while applying strong shear force with a bead mill and the like as in the method disclosed by Patent Literature 1 in order to obtain electrically conductive material, the fibrous carbons having a diameter of less than 100 nm was cut into short pieces, showing an aspect ratio of about 50. Furthermore, the fragmented multi-walled carbon nanotubes remain aggregated and are not dispersed homogeneously.

A object of the present invention is to provide composite carbon fibers which are easily dispersed in a matrix such as resin without leaving aggregates, and have an excellent effect to reduce electric resistance.

Solution to Problem

The present inventors conducted extensive studies to achieve the above object. As a result, the present invention including the following aspects has been completed.

[1] Composite carbon fibers, comprising: multi-walled carbon nanotubes wherein 99% by number or more of the multi-walled carbon nanotubes have a fiber diameter of not less than 5 nm and not more than 40 nm, carbon particles having a primary particle diameter of not less than 20 nm and not more than 100 nm and graphitized carbon nanofibers wherein 99% by number or more of the graphitized carbon nanofibers have a fiber diameter of not less than 50 nm and not more than 300 nm, wherein the multi-walled carbon nanotubes are homogeneously dispersed between the graphitized carbon nanofibers and the carbon particles.

[2] The composite carbon fibers according to [1], wherein the multi-walled carbon nanotubes in the composite carbon fibers have an aspect ratio of 100 or higher.

[3] The composite carbon fibers according to any one of [1] to [2], wherein the content of the carbon particles is not less than 30% by mass and not more than 90% by mass inclusive, and the mass ratio of the multi-walled carbon nanotubes:the graphitized carbon nanofibers is 1:9 to 8:2.

[4] The composite carbon fibers according to any one of [1] to [3], which do not essentially comprise multi-walled carbon nanotube aggregates having an aggregate size of 1 μm or more.

[5] Aggregates comprising the composite carbon fibers according to any one of [1] to [4].

[6] The aggregates comprising the composite carbon fibers according to [5], wherein a 50% particle diameter ($D_{50}$) in volume based accumulative particle size distribution as determined by laser diffraction particle size measurements is not less than 5 μm and not more than 20 μm.

[7] The aggregates comprising the composite carbon fibers according to [5] or [6], wherein the viscosity ratio ($v/v_0$) of the viscosity v of first paste to the viscosity $v_0$ of second paste is 1.05 or more, the first paste being prepared by kneading composite carbon fiber aggregates with a liquid medium, the composite carbon fiber aggregates comprising the multi-walled carbon nanotubes, the graphitized carbon nanofibers and the carbon particles; the second paste being prepared by kneading a composition with a liquid medium, the composition being prepared by mixing the multi-walled carbon nanotubes, the graphitized carbon nanofibers and the carbon particles in the same mass ratio by dry process.

[8] A battery electrode, comprising the composite carbon fibers according to any one of [1] to [4], or the composite carbon fiber aggregates according to any one of [5] to [7].

Advantageous Effects of Invention

The composite carbon fibers according to one embodiment in the present invention are easily dispersed without leaving aggregates while maintaining a high aspect ratio upon addition to a matrix such as resin, and show an excellent effect to reduce electric resistance when added in a smaller amount. When the composite carbon fibers according to one embodiment in the present invention are contained in an electrode of a lithium secondary battery as an electrical conductivity imparting agent, battery characteristics such as a capacity maintenance ratio can be improved.

DESCRIPTION OF EMBODIMENTS

Figure 1:
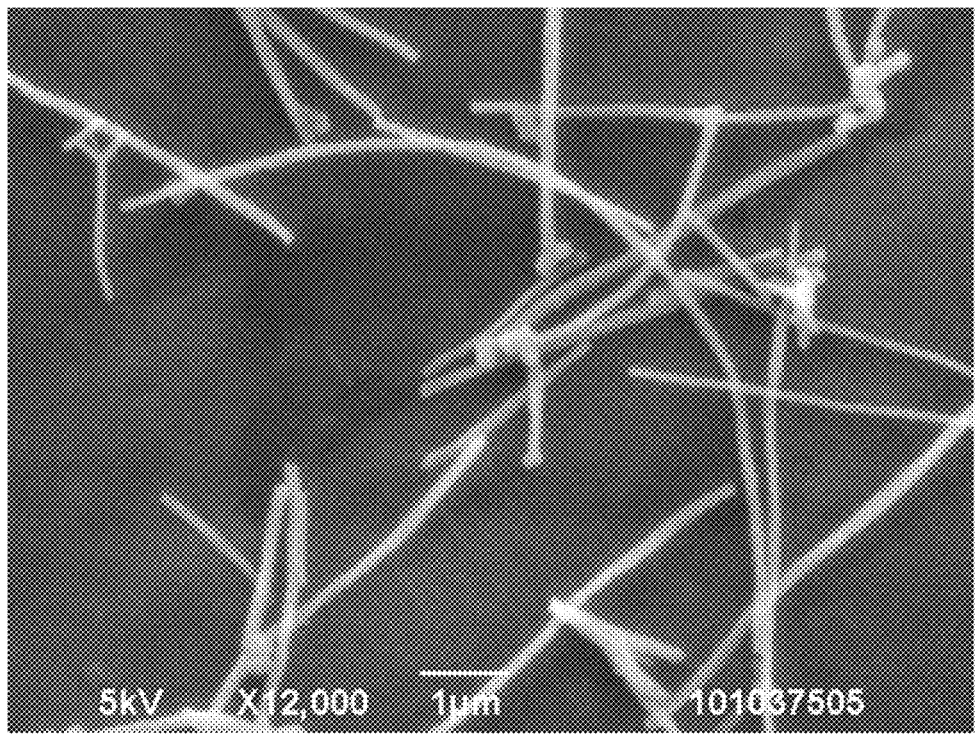
FIG. 1 shows an example of a scanning electron microscope image of the graphitized carbon nanofibers.

The composite carbon fibers according to one embodiment in the present invention comprise multi-walled carbon nanotubes, carbon particles and graphitized carbon nanofibers.

For the multi-walled carbon nanotubes used for the present invention, 99% by number or more of the multi-walled carbon nanotubes have a fiber diameter of not less than 5 nm and not more than 40 nm, preferably not less than 7 nm and not more than 20 nm, more preferably not less than 9 nm and not more than 15 nm. Multi-walled carbon nanotubes having a small fiber diameter may be often difficult to be dispersed in a state where each of them is untangled. Multi-walled carbon nanotubes having a large fiber diameter may be often difficult to be manufactured by the supported catalyst method.

The multi-walled carbon nanotubes used for the present invention may have a tubular structure in which graphene sheets comprising carbon six membered rings are rolled in parallel to the fiber axis, a platelet structure in which graphene sheets are perpendicularly arranged to the fiber axis or a herringbone structure in which graphene sheets are rolled with an oblique angle to the fiber axis. Among these, the multi-walled carbon nanotubes with a tubular structure are preferred in view of electric conductivity and mechanical strength.

The aspect ratio of the multi-walled carbon nanotubes as a raw material is preferably not less than 100 and not more than 1000, more preferably not less than 400 and not more than 1000. When the aspect ratio is small, dispersion may be easy, but long distance electrically conductive networks may be often difficult to be formed. When the aspect ratio is large, the degree of entanglement between fibers may be strong, and dispersion may be often difficult.

Further, the multi-walled carbon nanotubes in the composite carbon fibers have an aspect ratio of preferably 100 or more, more preferably 200 or more, even more preferably 400 or more. Note that the upper limit of the aspect ratio of the multi-walled carbon nanotubes in the composite carbon fibers is not particularly limited, but is 1000 or less in view of dispersion efficiency. Even if the aspect ratio of the multi-walled carbon nanotubes as a raw material is high, the aspect ratio is generally decreased because the multi-walled carbon nanotubes may be fragmented by the shear force applied in the dispersion step. In the present invention, however, the aspect ratio is preferably within the above ranges even in a case where the aspect ratio is decreased during compounding.

The BET specific surface area of the multi-walled carbon nanotubes as a raw material is preferably not less than 150 m$^2$/g and not more than 300 m$^2$/g, more preferably not less than 240 m$^2$/g and not more than 280 m$^2$/g, even more preferably not less than 250 m$^2$/g and not more than 270 m$^2$/g.

Further, the $C_0$ value of the multi-walled carbon nanotubes is preferably not less than 0.680 nm and not more than 0.690 nm. When the $C_0$ value of the multi-walled carbon nanotubes is small, aggregates may be often difficult to be untangled.

The oxidation starting temperature of the multi-walled carbon nanotubes as a raw material is preferably not less than 400° C. and not more than 550° C. In this context, the oxidation starting temperature is a temperature at which the weight is decreased by 0.1% relative to the initial weight (the prepared amount) when heated to 1000° C. at 10° C./min under air flow in a thermobalance. A lower oxidation starting temperature tends to cause more defects in carbon crystals.

The multi-walled carbon nanotubes as a raw material have a compressed specific resistance of preferably not less than 0.014 Ω·cm and not more than 0.020 Ω·cm at the compressed density of 0.8 g/cm$^3$. Multi-walled carbon nanotubes with small compressed specific resistance tend to have low flexibility while multi-walled carbon nanotubes with large compressed specific resistance tend to have a low electric conductivity imparting effect.

The multi-walled carbon nanotubes used for the present invention are not particularly limited by synthesis methods thereof, but are preferably synthesized by gas phase methods. Among the gas phase methods, those synthesized by the supported catalyst method is preferred.

The supported catalyst method is a method in which carbon fibers are manufactured by reacting a carbon source in the gas phase using catalyst where catalyst metals are supported on inorganic supports.

Examples of the inorganic supports include alumina, magnesia, silica titania, calcium carbonate and the like. The inorganic supports are preferably in a form of powdered granular. Examples of the catalyst metals include iron, cobalt, nickel, molybdenum, vanadium and the like. Supporting can be performed by impregnating supports in a solution of a compound comprising a catalyst metal element, by performing co-precipitation of a solution of a compound comprising a catalyst metal element and a compound comprising an element which constitutes an inorganic support, or by other known methods of supporting.

Examples of the carbon sources include methane, ethylene, acetylene and the like. The reaction can be performed in a reaction vessel such as fluid bed, moving bed and fixed bed. A temperature during the reaction is preferably set at 500° C. to 800° C. Carrier gas can be used in order to supply a carbon source to a reaction vessel. Examples of the carrier gas include hydrogen, nitrogen, argon and the like. A reaction time is preferably for 5 to 120 minutes.

The amount of the multi-walled carbon nanotubes contained in the composite carbon fibers is preferably not less than 1% by mass and not more than 60% by mass, more preferably not less than 15% by mass and not more than 40% by mass.

The carbon particles used for the present invention have a primary particle diameter of not less than 20 nm and not more than 100 nm, preferably not less than 30 nm and not more than 50 nm. Examples of the carbon particles include carbon black based electrically conductive particles such as acetylene black, furnace black and ketjen black.

The amount of the carbon particles contained in the composite carbon fibers is preferably not less than 10% by mass and not more than 94% by mass, more preferably not less than 20% by mass and not more than 70% by mass.

For the graphitized carbon nanofibers used for the present invention, 99% by number or more of the graphitized carbon nanofibers have a fiber diameter of not less than 50 nm and not more than 300 nm, preferably not less than 75 nm and not more than 250 nm, more preferably not less than 100 nm and not more than 200 nm. The graphitized carbon nanofibers with a large fiber diameter usually have a small aspect ratio, and networks in a matrix such as resin may be often difficult to be efficiently formed. On the other hand, the graphitized carbon nanofibers with a small fiber diameter are susceptible to aggregation and often not untangled and difficult to be dispersed in a matrix such as resin because they usually have a high aspect ratio.

The BET specific surface area of the graphitized carbon nanofibers is preferably not less than 6 $m^2/g$ and not more than 40 $m^2/g$, more preferably not less than 8 $m^2/g$ and not more than 25 $m^2/g$, even more preferably not less than 10 $m^2/g$ and not more than 20 $m^2/g$.

Further, the $C_0$ value of the graphitized carbon nanofibers is preferably not less than 0.676 nm and not more than 0.680 nm. When the $C_0$ value of the graphitized carbon nanofibers is larger than 0.680 nm, electric conductivity tends to be decreased.

The oxidation starting temperature of the graphitized carbon nanofibers is preferably not less than 600° C. and not more than 700° C. For the graphitized carbon nanofibers having an oxidation starting temperature of less than 600° C., graphite crystals may not be fully developed.

The graphitized carbon nanofibers have a compressed specific resistance of not less than 0.006 Ω·cm and not more than 0.017 Ω·cm at the compressed density of 0.8 $g/cm^3$. It may be difficult to achieve a compressed specific resistance of less than 0.006 Ω·cm for the graphitized carbon nanofibers. On the other hand, when a compressed specific resistance is larger than 0.017 Ω·cm, an electric conductivity imparting effect may be decreased.

The graphitized carbon nanofibers used for the present invention are not particularly limited by synthesis methods thereof, but are preferably manufactured by the synthesis of carbon nanofibers by gas phase methods and the graphitization of the synthesized carbon nanofibers. Among the gas phase methods, the carbon nanofibers synthesized by the floating catalyst method are preferred. The graphitization of carbon nanofibers is preferably performed by the method comprising heat-treating the carbon nanofibers synthesized by a gas phase method at not less than 2000° C. under an inert atmosphere.

The floating catalyst method is a method in which carbon fibers are obtained by introducing a raw material liquid or a gasification product thereof where ferrocene and a sulfur compound as a catalyst source are dissolved in benzene as a carbon source into a flow reactor furnace heated at 1000° C. or higher using carrier gas such as hydrogen. Generally, a hollow tube is formed starting at the catalyst metal in the initial stage of the reaction, and an approximate length of the carbon fiber is determined. Subsequently, pyrolyzed carbon is deposited on the surface of the hollow tube, and the growth of the fiber in a radial direction progresses, forming a growth ring-like carbon structure. Therefore, the fiber diameter can be adjusted by controlling a deposited amount of the pyrolyzed carbon on the hollow tube during the reaction: i.e. a reaction time, a concentration of the raw material in the atmosphere and a reaction temperature. The carbon nanofibers obtained by this reaction may have low electric conductivity since they are covered with pyrolyzed carbon having low crystallinity. Accordingly, in order to increase the crystallinity of the carbon fibers, heat treatment is performed at 800 to 1500° C. under an inert gas atmosphere such as argon and the like, and then graphitization treatment is performed at 2000 to 3000° C. The graphitization treatment allows evaporative removal of the catalyst metal to make the carbon nanofibers highly pure.

The amount of the graphitized carbon nanofibers contained in the composite carbon fibers is preferably not less than 5% by mass and not more than 60% by mass, more preferably not less than 15% by mass and not more than 40% by mass.

In general, since multi-walled carbon nanotubes are extremely susceptible to aggregation, aggregates of the multi-walled carbon nanotubes having an aggregate size of 1 μm or more are present independently from graphitized carbon nanofibers even if the graphitized carbon nanofibers, the multi-walled carbon nanotubes and the carbon particles are mixed by dry process. Thus, the multi-walled carbon nanotubes will not be homogeneously dispersed between the graphitized carbon nanofibers and the carbon particles (see FIGS. 7 and 8).

Figure 9:
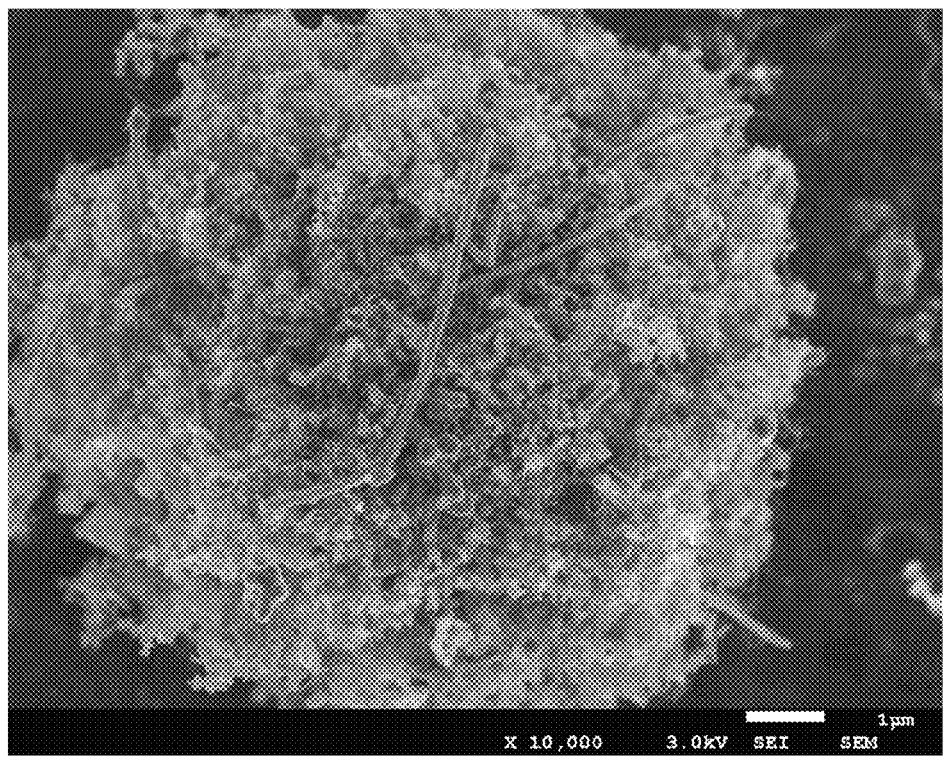
FIG. 9 shows an example of a scanning electron microscope image of the composite carbon fibers (2).
Figure 10:
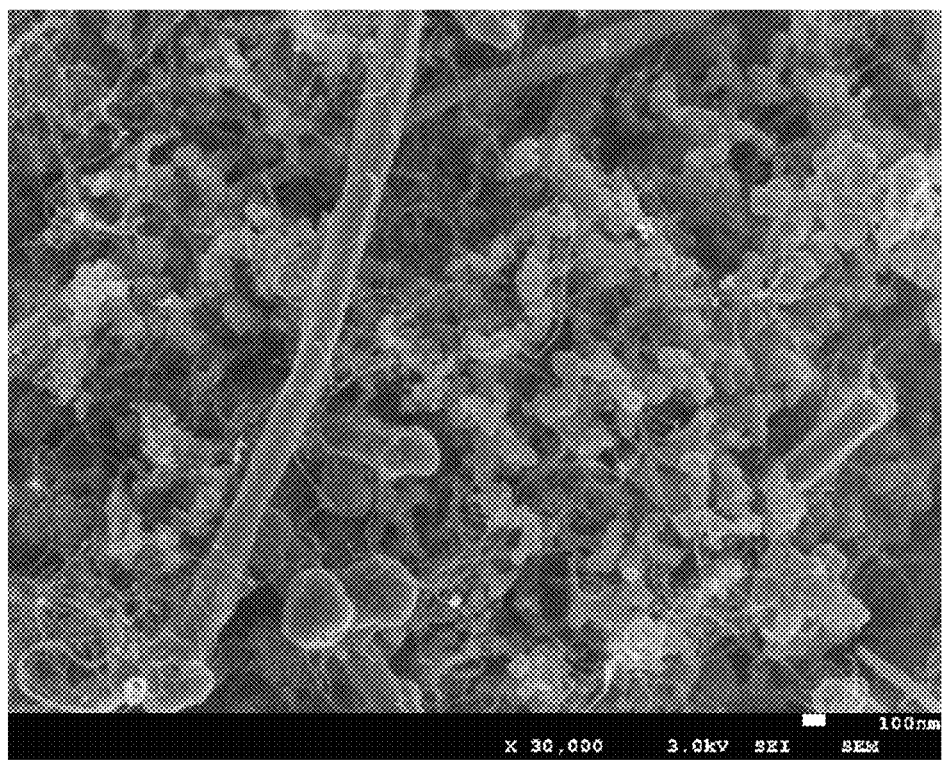
FIG. 10 shows an example of a scanning electron microscope image of the composite carbon fibers (2).

In the composite carbon fibers according to one embodiment in the present invention, the multi-walled carbon nanotubes are homogeneously dispersed between the graphitized carbon nanofibers and the carbon particles. As shown in FIGS. 9 and 10, this dispersion state is such that the graphitized carbon nanofibers and the carbon particles are present in a space between the multi-walled carbon nanotubes untangled into a loosened state, and the multi-walled carbon nanotubes in the untangled state are entangled on the surfaces of the graphitized carbon nanofibers and the carbon particles.

Figure 7:
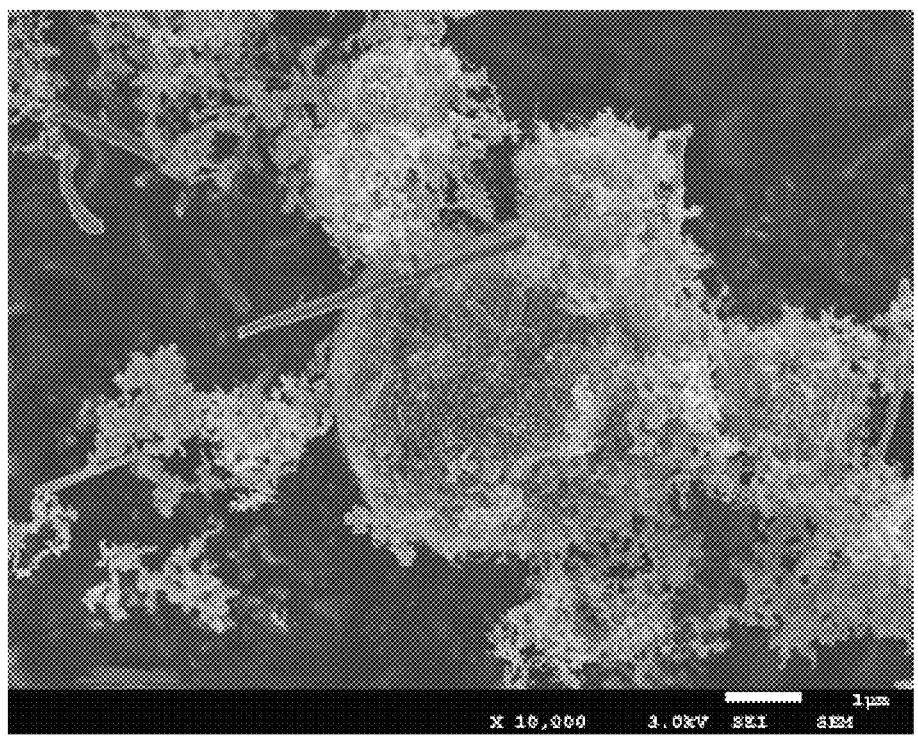
FIG. 7 shows an example of a scanning electron microscope image of the mixed carbon fibers (2).
Figure 8:
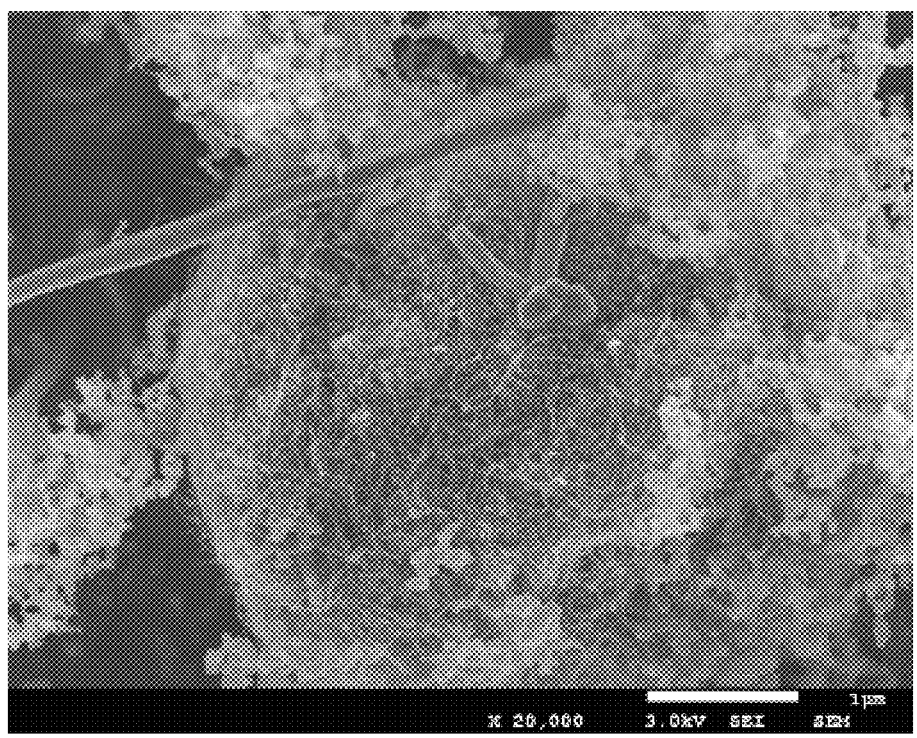
FIG. 8 shows an example of a scanning electron microscope image of the mixed carbon fibers (2).

The dispersion state in the composite carbon fibers according to one embodiment in the present invention, which is completely different from the states shown in FIGS. 7 and 8, is quite unique.

The composite carbon fibers according to one embodiment in the present invention do not essentially comprise aggregates of the multi-walled carbon nanotubes having an aggregate size of 1 μm or more. The phrase "do not essentially comprise multi-walled carbon nanotube aggregates having an aggregate size of 1 μm or more" means that when the composite carbon fibers are randomly observed at 10 fields (the area of one field: 70 µm×70 µm) under a scanning electron microscope at a magnification of 2 k, a multi-walled carbon nanotube aggregate having an aggregate size of 1 µm or more is observed only in one field or less.

The composite carbon fibers according to one embodiment in the present invention can be obtained, for example, by the following method. First, multi-walled carbon nanotubes, graphitized carbon nanofibers and carbon particles are added to pure water and mixed to obtain a mixture. The mixture is separated into the carbon materials and pure water when allowed to keep for several minutes. This shows that no physical change has occurred to the carbon materials. Subsequently, the mixture is introduced with pressure using a pump into a grinding nozzle of a high-pressure dispersing device to obtain paste or slurry. As the mixture passes through the nozzle in ultra high-speed, strong shear force is generated by turbulence, this shear force and the cavitation effect untangles the multi-walled carbon nanotube aggregates, and the graphitized carbon nanofibers and the carbon particles will be homogeneously compounded. Further, the graphitized carbon nanofibers and the carbon particles appear not only to serve as dispersing media for the multi-walled carbon nanotubes, but also to suppress re-aggregation of the untangled multi-walled carbon nanotubes. The paste or the slurry prepared by subjecting the mixture to the high-pressure dispersion treatment showed significantly high viscosity, and was not separated even after left to keep. This reasonably suggests that the aggregates of the multi-walled carbon nanotubes after the high-pressure dispersing treatment are untangled and networks are formed in the paste or the slurry. A solid content concentration of the mixture (a concentration of the multi-walled carbon nanotubes, the graphitized carbon nanofibers and the carbon particles) is preferably 5% by mass or less. Because a solid content concentration of greater than 5% by mass will increase the viscosity of the mixture, effective dispersion of the multi-walled carbon nanotube aggregates tends to be difficult to proceed. Note that use of a dispersing agent is not preferred because the dispersing agent added to the mixture is difficult to be removed.

Examples of high-pressure dispersing devices include Nanovater provided from Yoshida Kikai Co., Ltd., Nanomaker provided from Advanced Nano Technology Co., Ltd., and the like. An injection pressure to the nozzle is preferably not less than 100 MPa and not more than 250 MPa. Further, the number of injections/passages of the liquid to/through the nozzle is preferably 5 or less. The number of injections/passages of more than 5 tends to cause fiber fragmentation and re-aggregation of the multi-walled carbon nanotubes and the graphitized carbon nanofibers.

Next, the resulting paste or slurry is dried for powderization. Examples of drying method include spray drying, lyophilization, drum drying, flash drying, hot-air drying, vacuum drying and the like. Drying temperature is suitably selected depending on drying devices. Drying is preferably performed until the water content becomes 0.5% by mass or less as measured with the Karl Fischer method. After drying, pulverization is preferably performed if desired. For methods of pulverization, preferred are a pulverizer using the force of impact by a hammer and the like, a jet mill using mutual collisions of a material to be pulverized and the like.

The composite carbon fibers obtained in this way usually exits in a form of a population of aggregates. The size of the aggregates has a 50% particle diameter $D_{50}$ in volume-based particle size distribution of preferably not less than 5 µm and not more than 20 µm as measured with a particle size distribution measuring device using the laser diffraction/scattering method.

The viscosity ratio ($v/v_0$) of the viscosity v of first paste to the viscosity $v_0$ of second paste is preferably 1.05 or more, more preferably 1.1 or more, the first paste being prepared by kneading composite carbon fiber aggregates with a liquid medium, the composite carbon fiber aggregates comprising the multi-walled carbon nanotubes, the graphitized carbon nanofibers and the carbon particles; the second paste being prepared by kneading a composition with liquid medium, the composition being prepared by mixing the multi-walled carbon nanotubes, the graphitized carbon nanofibers and the carbon particles in the same mass ratio by dry process. The larger the degree of dispersion is, the larger the viscosity of the slurry tends to be for the same composition and same solid content concentration due to the development of the cross-linked structure of the carbon fibers.

The composite carbon fibers according to one embodiment in the present invention have a function as an electrical conductivity imparting agent. Therefore, they can be suitably used for a positive electrode and/or a negative electrode for a battery. For example, a positive electrode for a battery comprises a positive electrode active material, an electrical conductivity imparting agent and a binder. For example, a negative electrode for a battery comprises a negative electrode active material, an electrical conductivity imparting agent and a binder.

With regard to the positive electrode active material, any one or more of the conventional materials known as a positive electrode active material for a lithium based battery (materials capable of intercalating and deintercalating lithium ions) may be appropriately selected for use. Among these, lithium-containing metal oxides capable of intercalating and deintercalating lithium ions are suitable. The lithium-containing metal oxides can include composite oxides comprising elemental lithium and at least one element selected from Co, Mg, Cr, Mn, Ni, Fe, Al, Mo, V, W, Ti and the like.

With regard to the negative electrode active material, any one or more of the conventional materials known as a negative electrode active material for a lithium based battery (materials capable of intercalating and deintercalating lithium ions) may be appropriately selected for use. For example, materials capable of intercalating and deintercalating lithium ions can include any of carbon materials, Si and Sn, or alloys and oxides comprising at least one of these. Among these, carbon materials are preferred. Representative examples of the carbon materials can include natural graphite; artificial graphite produced by heat-treating petroleum-based coke and coal-based coke; hard carbon in which resin is carbonized; mesophase pitch-based carbon materials; and the like. In the case of natural graphite or artificial graphite, preferred are those having an interplanar spacing $d_{002}$ of 0.335 to 0.337 nm as calculated from the (002) diffraction line by the powder X-ray diffraction method in view of increased battery capacity. As a negative electrode active material other than carbon materials, each of Si and Sn can be used alone, an alloy comprising at least one of Si and Sn can be used, or corresponding oxides thereof can be utilized.

The binder can be suitably selected for use from the conventional materials known as a binder for an electrode of a lithium based battery. Such binders can include, for example, fluorine-containing high molecular weight polymers such as poly(vinylidene fluoride), vinylidene fluoride-hexafluoropropylene copolymer, vinylidene fluoride-chlorotrifluoroethylene copolymer and vinylidene fluoride-tetrafluoroethylene copolymer; styrene-butadiene copolymerized rubber (SBR); acrylic rubber; and the like.

EXAMPLES

Examples of the present invention will be described below to illustrate the present invention in more detail. Note that these are shown for merely illustrative purposes. The present invention shall not be construed as limited thereto in any way.

Properties and the like of the multi-walled carbon nanotubes and the graphitized carbon nanofibers were measured as follows.

[Scanning Electron Microscope Observation]

A sample of powder was adhered to a strip of carbon tape and subjected to gold deposition to give an observation sample, which was then observed with JSM-6390 provided from JEOL Ltd.

(Dispersion State)

The dispersion state was determined by observing 10 fields under the scanning electron microscope at a magnification of 30 k to find a state in which the graphitized carbon nanofibers and the carbon particles were present in a space between the multi-walled carbon nanotubes untangled into a loosened state, and the untangled multi-walled carbon nanotubes were entangled on the surfaces of the graphitized carbon nanofibers. In a case where the dispersion state was observed in 8 fields or more out of the 10 fields, the word "Good" was given in Table 2 as "the multi-walled carbon nanotubes are homogeneously dispersed between the graphitized carbon nanofibers and the carbon particles." In a case where the dispersion state was observed in less than 2 out of the 10 fields, the word "Poor" was given in Table 2 as "the multi-walled carbon nanotubes are not homogeneously dispersed between the graphitized carbon nanofibers and the carbon particles." Further, in a case where the dispersion state was observed in 2 fields or more but less than 8 fields out of the 10 fields, it was evaluated to be "Fair" as "the multi-walled carbon nanotubes are fairly homogeneously dispersed between the graphitized carbon nanofibers and the carbon particles." The composite carbon fibers of the present invention are preferably "Good" or "Fair", more preferably "Good."

(The Presence of Multi-Walled Carbon Nanotube Aggregates (CNT Fuzzball) Having an Aggregate Size of 1 μm Or More)

Under the scanning electron microscope, 10 fields were observed at a magnification of 10 k times, and in a case where the presence of a multi-walled carbon nanotube aggregate having an aggregate size of 1 μm or more was observed in one field or less out of the 10 fields, the word "None" was given at Table 2 as "do not essentially comprise multi-walled carbon nanotube aggregates having an aggregate size of 1 μm or more." In a case where the presence of a multi-walled carbon nanotube aggregate having an aggregate size of 1 μm or more was observed in 2 fields or more out of the 10 fields, the word "Yes" was given at Table 2 as "essentially comprise multi-walled carbon nanotube aggregates having an aggregate size of 1 μm or more."

Note that in a case where a spherical substance in an order of microns was observed at a magnification of 10 k times, the spherical substance was further observed at a magnification of 10 k or higher to redetermine whether it was an aggregate of the multi-walled carbon nanotubes.

(Fiber Diameter of the Carbon Nanofibers)

A fiber diameter was measured for 100 fibers or more at a magnification of 20 k times under the scanning electron microscope. The fiber diameter distribution and the mean fiber diameter were evaluated from them.

(Fiber Length of the Carbon Nanofibers)

The fibers were panoptically photographed at a magnification of 10 k times or higher under the scanning electron microscope, and a field was prepared in which the both ends of a fiber can be measured. Length was measured for 100 fibers or more, which were averaged to give the fiber length.

[Transmission Electron Microscope Observation]

A sample of powder in a small amount was transferred in ethanol, and dispersed by ultrasonic irradiation, which was held at a carbon micro grid (with a supporting membrane). This, in turn, was used as an observation sample, and observed with Hitachi 9500.

(Fiber Diameter of the Multi-Walled Carbon Nanotubes)

A fiber diameter was measured for 100 fibers or more at a magnification of 100 k times under the transmission electron microscope. The fiber diameter distribution and the mean fiber diameter were evaluated from them.

(Fiber Length of the Multi-Walled Carbon Nanotubes)

The fibers were panoptically photographed at a magnification of 100 k times or higher under the transmission electron microscope, and a field was prepared in which the both ends of a fiber can be measured. Length was measured for 50 fibers or more, which were averaged to give the fiber length.

(Compressed Specific Resistance, Load-Compressed Density Curve)

Figure 13:
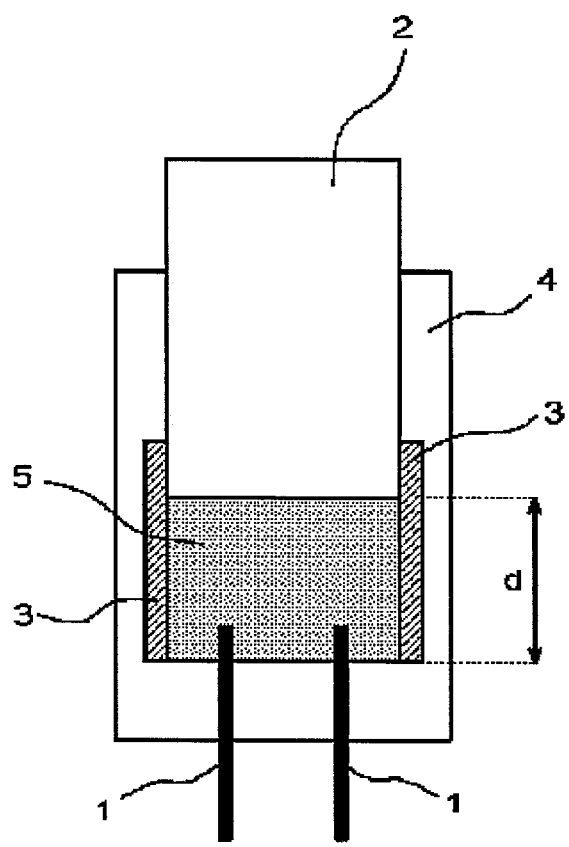
FIG. 13 shows an example of a jig used to measure a compressed specific resistance.

A measurement jig shown in FIG. 13 was used. Cell 4, which is made of resin and has an inside dimension of 4 cm in width×1 cm in depth×10 cm in height, is provided with Electric current terminal 3 of a copper plate for applying electric current to Analyte 5 and Voltage measurement terminal 1 in the middle. A fixed amount of a sample is placed in Cell 4, and then force is applied to Compression rod 2 from above to compress the sample. Electric current at 0.1 A was allowed to flow through the sample, and when a bulk density was 0.8 g/cm$^3$, a value of the voltage between two Voltage measurement terminals 1 inserted from the bottom of the container and separated by 2.0 cm was read to calculate specific resistance R from the following formula.

$$R = (\text{voltage}/\text{current}) \times (\text{cross section}/\text{distance between terminals})$$

$$= (E/0.1) \times (D/2)$$

wherein, Cross section D in the electric current direction=height×depth of the compressed body=d×1 (cm$^2$), and E is the voltage between the terminals [V].

The specific resistance varies depending on pressurizing conditions. The specific resistance is high under low pressure while it becomes lower as pressure increases. Above a certain pressure value, it shows an almost constant value. In this Example, the specific resistance when compressed to a bulk density of 0.8 g/cm$^3$ is designated as compressed specific resistance.

(Specific Surface Area)

Yuasa Ionics NOVA 1000 was used to measure an amount of nitrogen gas adsorbed under the liquid nitrogen temperature (77 K) to compute it by the BET method.

($C_0$ Measurements)

Using horizontally arranged sample multiple-purpose X-ray diffractometer (UltimaIV, Rigaku Corporation), measurements were performed using silicon powder as an internal standard in accordance with the Gakushin method ("Latest Carbon Material Experiment Techniques (Measurement/Analysis)", edited by Carbon Society of Japan).

(Thermal Analysis)

EXSTAR 6000 TG/DTA from SII Nanotechnology was used for the thermal analysis. On a platinum pan, 10 mg of a sample was loaded. Measurement conditions for the thermal analysis were as follows: heating to 1000° C. at 10° C./min under air flow of 100 ml/min.

(Particle Size Measurements)

To a beaker containing 20 ml of pure water, 0.007 g of a sample was weighed and added, to which 0.2 g of diluted Triton (diluted 100 times with pure water) was added dropwise. The beaker was treated with an ultrasonic dispersing device for 5 minutes. Then, 30 ml of pure water was added to the beaker, and then again treated with the ultrasonic dispersing device for 3 minutes. The particle size of the sample in the dispersion liquid was measured with Nikkiso micro track HRA.

(Moisture Content Measurements)

A sample was introduced into a 200° C. heating furnace through which nitrogen gas was flowed, and the nitrogen gas flowed out of the furnace was introduced into a measurement cell in a Karl-Fisher moisture meter (Hiranuma Sangyo Co., Ltd., AQ-2200F) to measure moisture content. An integrated value up to the titration end point was taken as the moisture content.

(Viscosity)

Viscosity (cps) at a shearing speed of $10 \text{ s}^{-1}$ was measured in a viscoelasticity measuring device (Anton Paar GmbH, MCR301) equipped with a cone plate CP25-2.

Manufacturing Example 1

Catalyst Preparation

To prepare a support, aluminium hydroxide (Showa Denko K.K., HIGILITE® M-43 [registered trademark]) was heat-treated at 850° C. for 2 hours under the atmosphere in which air was flowing.

To a 300 ml tall beaker, 50 g of pure water were added, and then 4.0 g of the support were added and dispersed to prepare support slurry.

To a 50 ml beaker, 16.6 g of pure water were added and then 0.32 g of hexaammonium heptamolybdate tetrahydrate (Junsei Chemical Co., Ltd.) was added and dissolved. Subsequently, 7.23 g of iron (III) nitrate nonahydrate (Kanto Chemical Co., Inc.) were added and dissolved to prepare a catalyst solution.

Further, to another 50 ml beaker, 32.7 g of pure water were added, and then 8.2 g of ammonium carbonate (Kanto Chemical Co., Inc.) were added and dissolved to prepare a pH adjustment solution.

A stirring bar was placed in the tall beaker containing the support slurry, and stirred on a magnetic stirrer. Each of the catalyst solution and the pH adjustment solution was added dropwise to the support slurry with a Pasteur pipette while monitoring a pH meter to maintain a pH value of the slurry at 6.0±0.1. It took 15 minutes before all of the catalyst solution was added to the support slurry. The content in the tall beaker was separated on a filter paper (5C), and 50 g of pure water was sprinkled over the cake on the filter paper for washing. The washed cake was transferred to a porcelain dish, and dried in a 120° C. hot air oven for 6 hours. The resulting dried material was pulverized on a mortar to obtain a catalyst for synthesizing the multi-walled carbon nanotubes.

Manufacturing Example 2

Synthesis of the Multi-Walled Carbon Nanotubes: MWCNT

On a quartz boat, placed was 1.0 g of the catalysts obtained in Manufacturing Example 1. This was placed at the center of a horizontal tubular furnace (a quartz tube: inside diameter: 50 mm, length: 1500 mm, soaking zone: 600 mm). The horizontal tubular furnace was heated to 680° C. in 30 minutes with nitrogen gas flowed therethrough at 500 ml/min. Then, the nitrogen gas supply was stopped, and a mixed gas of ethylene and hydrogen (the concentration of ethylene: 50% by volume) was then supplied at 2000 ml/min, and allowed to react for 20 minutes to synthesize multi-walled carbon nanotubes. The mixed gas supply was stopped, and then nitrogen gas was supplied. After cooled down to room temperature, the multi-walled carbon nanotubes were taken out from the furnace.

Figure 2:
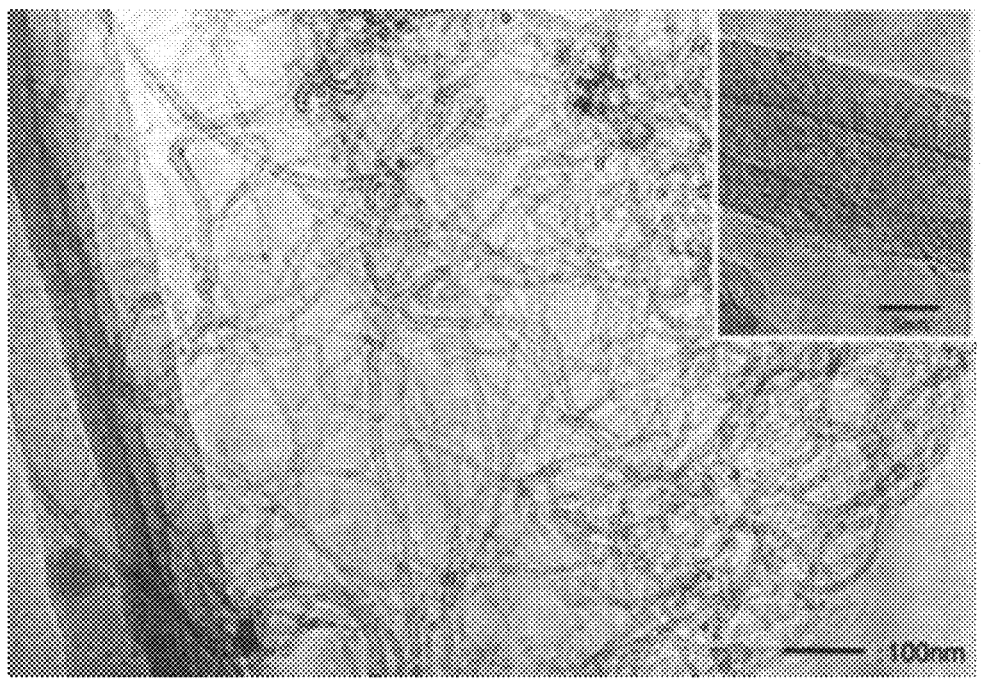
FIG. 2 shows an example of a transmission electron microscope image of the multi-walled carbon nanotubes.
Figure 3:
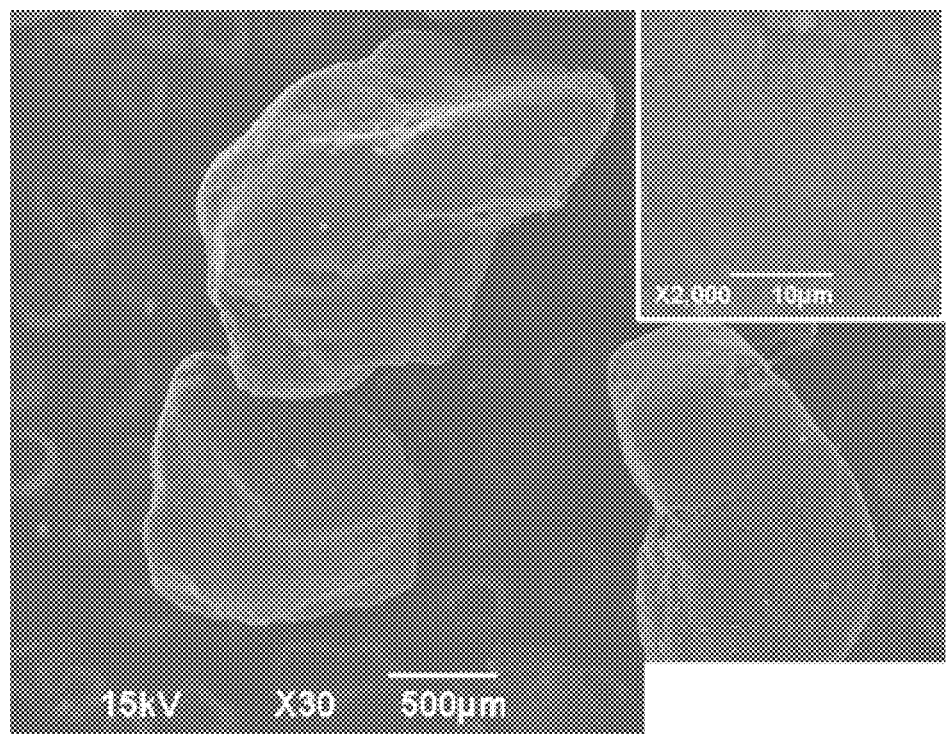
FIG. 3 shows an example of a scanning electron microscope image of the multi-walled carbon nanotube aggregates.
Figure 5:
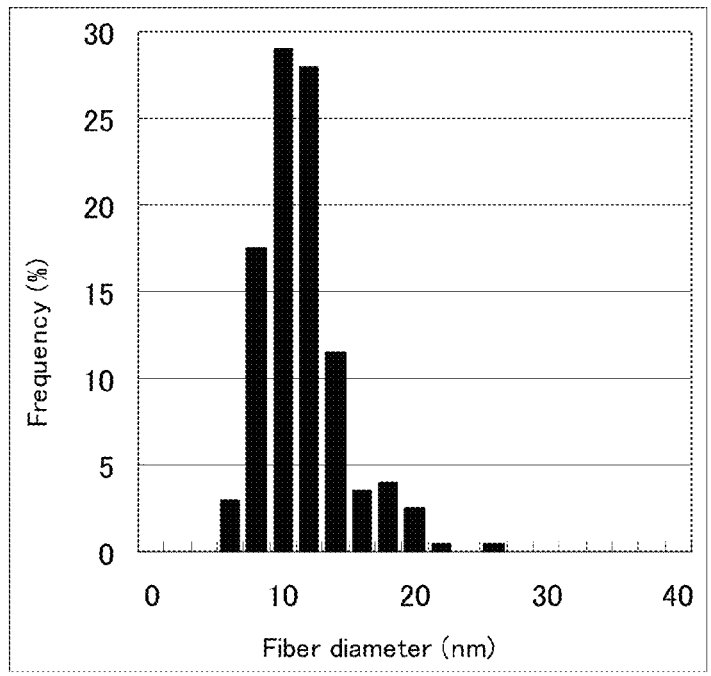
FIG. 5 shows an example of the fiber diameter distribution of the multi-walled carbon nanotubes.

Fiber dimensions and powder properties are shown in Table 1. A transmission electron microscope image is shown in FIG. 2, a scanning electron microscope image of aggregates is shown in FIG. 3 and the fiber diameter distribution is shown in FIG. 5.

Manufacturing Example 3

Pulverization of the Multi-Walled Carbon Nanotubes: Pulverized MWCNT

The multi-walled carbon nanotubes synthesized in Manufacturing Example 2 were fed to a jet mill STJ-200 from Seishin Enterprise Co., Ltd. at 6 kg/h for pulverization under the conditions of a pusher nozzle pressure of 0.64 MPa and a grinding nozzle pressure of 0.60 MPa. The 50% particle diameter $D_{50}$ in the volume based accumulative particle size distribution of the aggregates was 10 μm.

Figure 6:
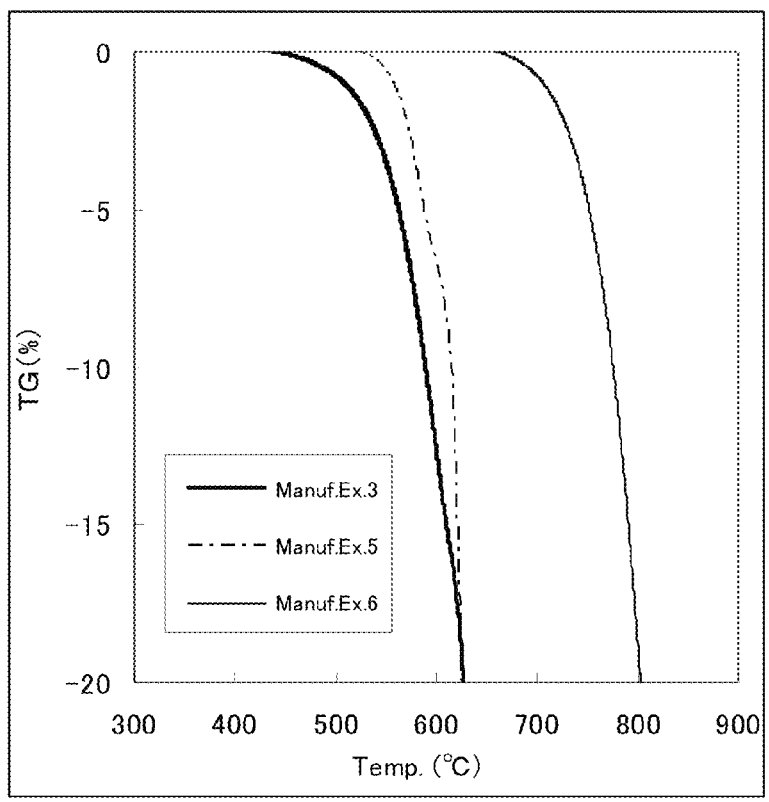
FIG. 6 shows an example of the results from the thermal analysis of the multi-walled carbon nanotubes, the carbon nanofibers and the graphitized carbon nanofibers.

Fiber dimensions and powder properties are shown in Table 1. The results from thermal analysis are shown in FIG. 6.

Manufacturing Example 4

Synthesis of the Carbon Nanofibers

A reactor comprising a reaction tube with an inside diameter of 370 mm and a length of 2000 mm and a heater was prepared. Two fluid mixing nozzles for supplying a raw material were provided at the upper part of the reaction tube, and a conveyor was arranged at the lower part of the reaction tube, which was connected to a tank with a bag filter installed. Inflammable gas passed through the bag filter was burned in an incinerator.

In order to prepare a liquid raw material (3.5% by mass of ferrocene and 0.08% by mass of sulfur in the liquid raw material), 0.49 kg of ferrocene and 0.01 kg of sulfur were dissolved in 13.5 kg of benzene.

The liquid raw material prepared and hydrogen were fed at 360 g/min and 700 NL/min, respectively. The liquid raw material was sprayed into the reaction tube through the two fluid nozzles and allowed to pass through the reaction tube heated at 1300° C. to synthesize carbon fibers. After feeding the raw material for 2 hours, the supply of the liquid raw material and hydrogen was stopped, and nitrogen was then supplied to expel inflammable gas.

Manufacturing Example 5

Calcination of the Carbon Nanofibers: Calcined CNF

A graphite crucible (outside diameter: 100 mm, inside diameter: 85 mm, length: 200 mm) was filled with 80 g of the carbon nanofibers obtained in Manufacturing Example 4, and placed in a calcination furnace (inside diameter: 120 mm). It was heated to 1200° C. in 4 hours under argon atmosphere, and the temperature was maintained for 1 hour to remove a tar component adhered to the carbon nanofibers. After calcination, the calcined carbon nanofibers recovered from the graphite crucible were crushed for 1 minute with a juicer mixer (Panasonic fiber mixer MX-X57).

Fiber dimensions and powder properties are shown in Table 1. The results from thermal analysis are shown in FIG. 6.

Manufacturing Example 6

Graphitization of the Carbon Nanofibers: Graphitized CNF

A graphite crucible was filled with the calcined carbon nanofibers obtained in Manufacturing Example 5, and placed in a high-frequency heating furnace (inside diameter: 120 mm). It was heated to 2800° C. in 4 hours under argon atmosphere, and the temperature was maintained for 1 hour to graphitize the carbon nanofibers. After the graphitization treatment, the graphitized carbon nanofibers recovered from the graphite crucible were pulverized with a Yakushin Kikai Seisakusyo stream mill KV-3 lab unit at a rotating speed of 5000 rpm.

Figure 4:
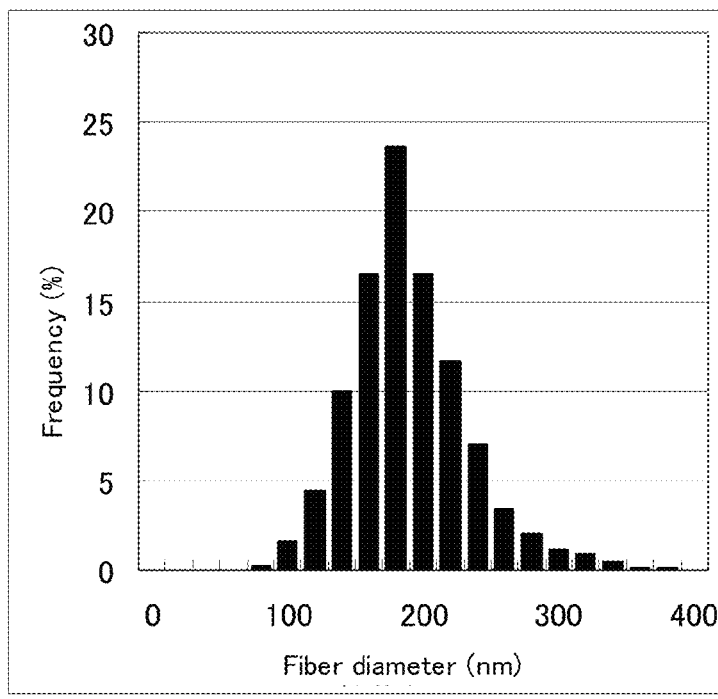
FIG. 4 shows an example of the fiber diameter distribution of the graphitized carbon nanofibers.

Fiber dimensions and powder properties are shown in Table 1. A scanning electron microscope image is shown in FIG. 1, the fiber diameter distribution is shown in FIG. 4 and the results from thermal analysis is shown in FIG. 6.

TABLE 1

| | Manuf. Example | | | |
|---|---|---|---|---|
| | 2 MWCNT | 3 Pulverized MWCNT | 5 Calcined CNF | 6 Graphitized CNF |
| Fiber diameter(nm) | 10 | 10 | 180 | 180 |
| Fiber length(μm) | 4.5 | 4.0 | 7.5 | 7.2 |
| Aspect ratio | 450 | 400 | 42 | 40 |
| Compressed specific resistance(Ω cm) | 0.0162 | 0.0178 | 0.0424 | 0.0151 |
| BET Specific sueface area(m²/g) | 260 | 260 | 14 | 13 |
| $C_o$(nm) | 0.683 | 0.683 | 0.693 | 0.677 |
| Oxidation starting temp.(° C.) | 460 | 460 | 510 | 660 |

Example 1

In a 5 L beaker, 2400 g of pure water and a stirring bar were placed, and the beaker was placed on a magnetic stirrer. To the pure water, 28 g of the graphitized carbon nanofibers obtained in Manufacturing Example 6, 12 g of the pulverized multi-walled carbon nanotubes obtained in Manufacturing Example 3 and 60 g of carbon particles (carbon black, primary particle diameter: 20 nm, Timcal Graphite & Carbon) were added, and stirred for 5 minutes. Then, the mixed liquid was added to a tank for a Nanovater from Yoshida Kikai Co., Ltd.

(High-Pressure Dispersion Treatment)

The mixed liquid in the tank was transferred to a slurry pump with a squeeze pump, and then pressed into a straight nozzle (nozzle diameter: 190 μm) with the slurry pump at 150 MPa. The liquid subjected to the high-pressure treatment with the straight nozzle was passed through a heat exchanger, and collected to a 5 L beaker. The number of passages of the mixed liquid through the straight nozzle was 1.

The liquid subjected to the high-pressure treatment was filtered with a filter paper (5C) placed in a Nutsche under a reduced pressure condition with an aspirator. When a cake-like solid substance on the filter paper showed a crack, and the pressure became near the atmospheric pressure (−150 mmHg) from a reduced pressure condition (−750 mmHg), filtration was stopped.

The resulting cake-like solid substance was placed on a porcelain dish, and dried for 9 hours in a hot air drying oven set at 150° C. The resulting dried substance was crushed for 1 minute with the juicer mixer to obtain the composite carbon fibers (1). No aggregate with a size of 1 μm or more composed of only the multi-walled carbon nanotubes was observed at all in the composite carbon fibers (1). This composite carbon fibers (1) were photographed under SEM at a magnification of 30 k times or higher. At a 1 μm×1 μm field where the graphitized carbon nanofibers were arranged at the center, 20 fields were observed. As a result, the graphitized carbon nanofibers, the multi-walled carbon nanotubes and the carbon particles were all observed in the fields, and the number of the field that the multi-walled carbon nanotubes occupied area of more than 0% and less than 10% a field is 20. That is, the graphitized carbon nanofibers, the multi-walled carbon nanotubes and the carbon particles were homogeneously dispersed in the composite carbon fibers (1).

(Production of a Li Ion Battery Test Cell (a Lamination Cell))

Using a TK Hivis Mix (Model 2P-03, PRIMIX Corporation), 90 parts by mass of lithium iron phosphate (LFP (LiFePO$_4$): the mean particle diameter: 2 μm), 5 parts by mass of the composite carbon fibers (1) as an electrical conductivity imparting agent and 5 parts by mass of poly(vinylidene fluoride) (KF-polymer (#1300), Kureha Chemical Industry Co., Ltd.) were mixed by dry process. N-methyl-2-pyrrolidone was added to the resulting mixture with kneading to obtain slurry having an optimal coating viscosity.

The slurry was applied to an aluminum foil using an automatic coater, and dried at 100° C., and then dried in a vacuum dryer (100° C.). Then, it was punched out in the predetermined size, and pressed using a uniaxial pressing machine to obtain a positive electrode with an electrode density of 2.0 g/cm³.

Using a TK Hivis Mix, 90.5 parts by mass of a negative electrode active material (SCMG [Registered Trademark]: Showa Denko K.K., the mean particle diameter: 6 μm), 2 parts by mass of carbon black, 0.5 part by mass of fibrous carbon (VGCF-H [Registered Trademark]: Showa Denko K.K.) and 7 parts by mass of poly(vinylidene fluoride) (KF-polymer (#9300), Kureha Chemical Industry Co., Ltd.) were mixed by dry process. N-methyl-2-pyrrolidone was added to the resulting mixture with kneading to obtain slurry having an optimal coating viscosity.

The slurry was applied to a copper foil using an automatic coater and dried at 90° C., and then dried in a vacuum dryer (90° C.). Then, it was punched out in the predetermined size, and pressed using a uniaxial pressing machine to obtain a negative electrode with an electrode density of 1.3 g/cm³.

Next, the following operations were performed under dry argon atmosphere with a dew point of −80° C. or less.

The positive electrode and the negative electrode were layered on the both sides of a separator (a polypropylene microporous film (Celgard LLC, Celgard 2400), 25 μm) to produce a layered product. The layered product was wrapped with aluminium for packing, and then heat-sealed at the three sides. An electrolytic solution was injected via the non-sealed side to be perfused in the layered product, and then the aluminium for packing was vacuum-sealed to obtain a test cell.

The electrolytic solution was prepared by dissolving both 1.0 mol/L of LiPF$_6$ as an electrolyte and 1% by mass of vinylene carbonate as an additive in a mixed solvent comprising 2 parts by volume of EC (ethylene carbonate) and 3 parts by volume of EMC (ethylmethyl carbonate).

(Large-Current Loading Test)

Charge and discharge were performed for an evaluation cell by the following method. First, constant current charge was performed at an electric current equivalent to 0.2 C from the rest potential to 3.6 V, and after reaching 3.6 V, constant voltage charge at 3.6 V was performed. Charge was stopped when the value of electric current decreased to a value equivalent to 1/20 C.

Next, constant current discharge was performed at an electric current equivalent to 0.2 C and equivalent to 10.0 C respectively, and cut off at a voltage of 2.0 V.

A ratio (10 C capacity ratio) of the discharge capacity at a value of electric current equivalent to 10.0 C relative to the discharge capacity at a value of electric current equivalent to 0.2 C was computed.

(DCR Property)

Charge and discharge were performed for an evaluation cell by the following method. Constant current charge was performed at an electric current equivalent to 0.2 C from the rest potential to 3.6 V, and after reaching 3.6 V, constant voltage charge at 3.6 V was performed. Charge was stopped when the value of electric current decreased to a value equivalent to 1/20 C.

Next, constant current discharge was performed at an electric current equivalent to 0.1 C for 5 hours. The depth of charge was set to 50%, and constant current discharge was then performed at an electric current equivalent to 1.0 C for 5 seconds, and the change in voltage $\Delta V$ before and after the discharge was measured. DCR ($\Omega$) was computed using the below formula.

$$DCR(\Omega)=\Delta V/(\text{the amount of current at } 1.0C)$$

(Cycle Characteristics)

Charge and discharge were performed for an evaluation cell by the following method. Constant current charge was performed at an electric current equivalent to 1.0 C from the rest potential to 3.6 V, and after reaching 3.6 V, constant voltage charge at 3.6 V was performed. Charge was stopped when the value of electric current decreased to a value equivalent to 1/20 C. Next, constant current discharge was performed at an electric current equivalent to 1.0 C, and cut off at 2.0 V. This charge and discharge operation was defined as one cycle, and 500 cycles were performed.

A ratio (discharge capacity maintenance) of the discharge capacity at the 500th cycle relative to the discharge capacity at the first cycle taken as 100% was computed.

The evaluation results of the composite carbon fibers (1), the slurry and the evaluation cell are shown in Table 2.

Example 2

Composite carbon fibers (2) were obtained by the same method as in Example 1 except that the amount of the graphitized carbon nanofibers obtained in Manufacturing Example 6 and the amount of the pulverized multi-walled carbon nanotubes obtained in Manufacturing Example 3 were both changed to 20 g. Positive electrode slurry was obtained by the same method as in Example 1 except that the composite carbon fibers (2) was substituted for the composite carbon fibers (1) to obtain an evaluation cell. The evaluation results of the composite carbon fibers (2), the slurry and the evaluation cell are shown in Table 2. The state of the composite carbon fibers (2) is shown in FIGS. 9 and 10. The graphitized carbon nanofibers, the multi-walled carbon nanotubes and the carbon particles were homogeneously dispersed in the composite carbon fibers (2) as in Example 1.

Example 3

Composite carbon fibers (3) were obtained by the same method as in Example 1 except that the amount of the graphitized carbon nanofibers obtained in Manufacturing Example 6 was changed to 12 g and the amount of the pulverized multi-walled carbon nanotubes obtained in Manufacturing Example 3 was changed to 28 g. Positive electrode slurry was obtained by the same method as in Example 1 except that the composite carbon fibers (3) were substituted for the composite carbon fibers (1) to obtain an evaluation cell. The evaluation results of the composite carbon fibers (3), the slurry and the evaluation cell are shown in Table 2. The graphitized carbon nanofibers, the multi-walled carbon nanotubes and the carbon particles were homogeneously dispersed in the composite carbon fibers (3) as in Example 1.

Example 4

Composite carbon fibers (4) were obtained by the same method as in Example 1 except that the amount of the graphitized carbon nanofibers obtained in Manufacturing Example 6 was changed to 35 g, the amount of the pulverized multi-walled carbon nanotubes obtained in Manufacturing Example 3 was changed to 35 g and the amount of carbon particles was changed to 30 g. Positive electrode slurry was obtained by the same method as in Example 1 except that the composite carbon fibers (4) were substituted for the composite carbon fibers (1) to obtain an evaluation cell. The evaluation results of the composite carbon fibers (4), the slurry and the evaluation cell are shown in Table 2. The graphitized carbon nanofibers, the multi-walled carbon nanotubes and the carbon particles were homogeneously dispersed in the composite carbon fibers (4) as in Example 1.

Example 5

Composite carbon fibers (5) were obtained by the same method as in Example 1 except that the amount of the graphitized carbon nanofibers obtained in Manufacturing Example 6 was changed to 5 g, the amount of the pulverized multi-walled carbon nanotubes obtained in Manufacturing Example 3 was changed to 5 g and the amount of carbon particles was changed to 90 g. Positive electrode slurry was obtained by the same method as in Example 1 except that the composite carbon fibers (5) were substituted for the composite carbon fibers (1) to obtain an evaluation cell. The evaluation results of the composite carbon fibers (5), the slurry and the evaluation cell are shown in Table 2. The graphitized carbon nanofibers, the multi-walled carbon nanotubes and the carbon particles were homogeneously dispersed in the composite carbon fibers (5) as in Example 1.

Comparative Example 1

Using a juicer mixer, 28 g of the graphitized carbon nanofibers obtained in Manufacturing Example 6, 12 g of the pulverized multi-walled carbon nanotubes obtained in Manufacturing Example 3 and 60 g of the carbon particles were mixed by dry process to obtain mixed carbon fibers (1). Positive electrode slurry was obtained by the same method as in Example 1 except that the mixed carbon fibers (1) were substituted for the composite carbon fibers (1) to obtain an evaluation cell. The evaluation results of the mixed carbon fibers (1), the slurry and the evaluation cell are shown in Table 2.

Comparative Example 2

Using a juicer mixer, 20 g of the graphitized carbon nanofibers obtained in Manufacturing Example 6, 20 g of the pulverized multi-walled carbon nanotubes obtained in Manufacturing Example 3 and 60 g of the carbon particles were mixed by dry process to obtain mixed carbon fibers (2). Positive electrode slurry was obtained by the same method as in Example 1 except that the mixed carbon fibers (2) were substituted for the composite carbon fibers (1) to obtain an evaluation cell. The evaluation results of the mixed carbon fibers (2), the slurry and the evaluation cell are shown in Table 2. The state of the mixed carbon fibers (2) is shown in FIGS. 7 and 8.

Comparative Example 3

Using a juicer mixer, 12 g of the graphitized carbon nanofibers obtained in Manufacturing Example 6, 28 g of the pulverized multi-walled carbon nanotubes obtained in Manufacturing Example 3 and 60 g of the carbon particles were mixed by dry process to obtain mixed carbon fibers (3). Positive electrode slurry was obtained by the same method as in Example 1 except that the mixed carbon fibers (3) were substituted for the composite carbon fibers (1) to obtain an evaluation cell. The evaluation results of the mixed carbon fibers (3), the slurry and the evaluation cell are shown in Table 2.

Comparative Example 4

Using a juicer mixer, 35 g of the graphitized carbon nanofibers obtained in Manufacturing Example 6, 35 g of the pulverized multi-walled carbon nanotubes obtained in Manufacturing Example 3 and 30 g of the carbon particles were mixed by dry process to obtain mixed carbon fibers (4). Positive electrode slurry was obtained by the same method as in Example 1 except that the mixed carbon fibers (4) were substituted for the composite carbon fibers (1) to obtain an evaluation cell. The evaluation results of the mixed carbon fibers (4), the slurry and the evaluation cell are shown in Table 2.

Comparative Example 5

Using a juicer mixer, 5 g of the graphitized carbon nanofibers obtained in Manufacturing Example 6, 5 g of the pulverized multi-walled carbon nanotubes obtained in Manufacturing Example 3 and 90 g of the carbon particles were mixed by dry process to obtain mixed carbon fibers (5). Positive electrode slurry was obtained by the same method as in Example 1 except that the mixed carbon fibers (5) were substituted for the composite carbon fibers (1) to obtain an evaluation cell. The evaluation results of the mixed carbon fibers (5), the slurry and the evaluation cell are shown in Table 2.

Comparative Example 6

Using a juicer mixer, 40 g of the graphitized carbon nanofibers obtained in Manufacturing Example 6 and 60 g of the carbon particles were mixed by dry process to obtain mixed carbon fibers (6). Positive electrode slurry was obtained by the same method as in Example 1 except that the mixed carbon fibers (6) were substituted for the composite carbon fibers (1) to obtain an evaluation cell. The evaluation results of the mixed carbon fibers (6), the slurry and the evaluation cell are shown in Table 2.

Comparative Example 7

Figure 11:
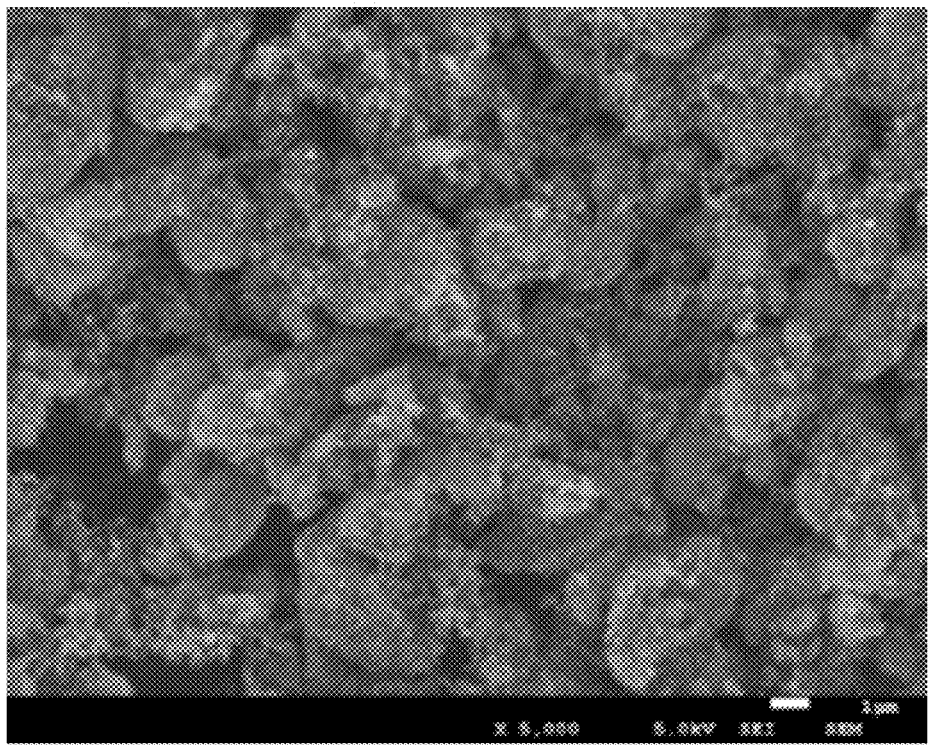
FIG. 11 shows an example of a scanning electron microscope image of the mixed carbon fibers (7).
Figure 12:
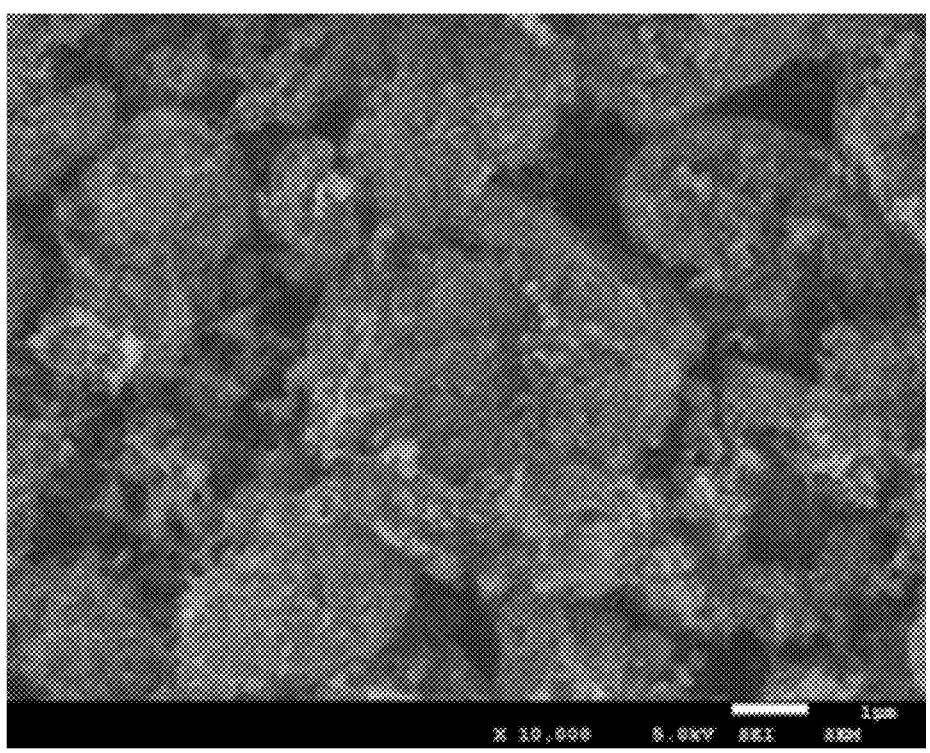
FIG. 12 shows an example of a scanning electron microscope image of the mixed carbon fibers (7).

Using a juicer mixer, 40 g of the pulverized multi-walled carbon nanotubes obtained in Manufacturing Example 3 and 60 g of the carbon particles were mixed by dry process to obtain mixed carbon fibers (7). Positive electrode slurry was obtained by the same method as in Example 1 except that the mixed carbon fibers (7) were substituted for the composite carbon fibers (1) to obtain an evaluation cell. The evaluation results of the mixed carbon fibers (7), the slurry and the evaluation cell are shown in Table 2. The state of the mixed carbon fibers (7) is shown in FIGS. 11 and 12.

TABLE 2

| | Example | | | | | Comp. Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| Powderization | Composing | Composing | Composing | Composing | Composing | Dry Mixing | Dry Mixing | Dry Mixing | Dry Mixing | Dry Mixing | Dry Mixing | Dry Mixing |
| Content of carbon particles[%] | 60 | 60 | 60 | 30 | 90 | 60 | 60 | 60 | 30 | 90 | 60 | 60 |
| Mass ratio of GCNF/PCNT | 7/3 | 5/5 | 3/7 | 5/5 | 5/5 | 7/3 | 5/5 | 3/7 | 5/5 | 5/5 | 10/0 | 0/10 |
| Presence of aggregates of 1 μm or larger | None | None | None | None | None | Yes | Yes | Yes | Yes | Yes | None | Yes |
| Dispersion state of PCNT | Good | Good | Good | Good | Good | Poor | Poor | Poor | Poor | Poor | — | — |
| Viscosity of slurry[cps] | 3020 | 3240 | 3560 | 3520 | 2980 | 2350 | 2540 | 2760 | 2590 | 2770 | 2210 | 3300 |
| V/Vo | 1.29 | 1.26 | 1.29 | 1.36 | 1.07 | — | — | — | — | — | — | — |
| 10 C capacity ratio[%] | 54.1 | 57.5 | 56.8 | 57.2 | 43.8 | 51.9 | 52.1 | 52.4 | 53.6 | 43.5 | 48.7 | 44.1 |
| DCR[Ω] | 3.5 | 2.4 | 2.5 | 2.4 | 3.9 | 3.3 | 3.1 | 3.1 | 2.9 | 3.9 | 3.8 | 4.3 |
| Discharge capacity maintenance[%] | 93.5 | 92.7 | 90.2 | 94.8 | 87.5 | 89.3 | 88.9 | 88.6 | 86.4 | 85.2 | 89.8 | 87.0 |

*GCNF: Graphitized Carbon nanofibers
PCNT: Puvleraized multi walled Carbon nanotubes Battery characteristics are improved by using the graphitized carbon nanofibers and the multi-walled carbon nanotubes in combination as compared with by using the graphitized carbon nanofibers or the multi-walled carbon nanotubes alone. Further, the results shows that the composite carbon fibers according to one embodiment in the present invention in which the multi-walled carbon nanotubes are highly pre-dispersed are easily and well dispersed upon addition to slurry because the dispersed state thereof is maintained. Therefore, the viscosity of the slurry is higher as compared with a case where a dry-mixed powder having the same composition is used.

In a case where a dry-mixed powder having the same composition is used, electric resistance is higher as compared with a case where the composite carbon fibers are used because the multi-walled carbon nanotubes are not completely dispersed. In addition to that, a cycle capacity maintenance is lower because the voltage distribution is not uniform within the electrode.

The invention claimed is:

1. Composite carbon fibers, comprising:
   multi-walled carbon nanotubes in which 99% by number or more of the multi-walled carbon nanotubes have a fiber diameter of not less than 5 nm and not more than 40 nm,
   carbon particles having a primary particle diameter of not less than 20 nm and not more than 100 nm, and
   graphitized carbon nanofibers in which 99% by number or more of the graphitized carbon nanofibers have a fiber diameter of not less than 50 nm and not more than 300 nm,
   wherein the graphitized carbon nanofibers and the carbon particles are present in a space between the multi-walled carbon nanotubes untangled into a loosened state, and the multi-walled carbon nanotubes in the untangled state are entangled on the surfaces of the graphitized carbon nanofibers and the carbon particles.

2. The composite carbon fibers according to claim 1, wherein the multi-walled carbon nanotubes in the composite carbon fibers have an aspect ratio of 200 or higher.

3. The composite carbon fibers according to claim 1, wherein the content of the carbon particles is not less than 30% by mass and not more than 90% by mass, and the mass ratio of the multi-walled carbon nanotubes:the graphitized carbon nanofibers is 1:9 to 8:2.

4. The composite carbon fibers according to claim 1, which do not essentially comprise multi-walled carbon nanotube aggregates having an aggregate size of 1 µm or more.

5. Aggregates comprising the composite carbon fibers according to claim 1.

6. The aggregates comprising the composite carbon fibers according to claim 5, wherein a 50% particle diameter ($D_{50}$) in volume based accumulative particle size distribution as determined by laser diffraction particle size measurements is not less than 5 µm and not more than 20 µm.

7. The aggregates comprising the composite carbon fibers according to claim 5, wherein the viscosity ratio ($v/v_0$) of the viscosity v of first paste to the viscosity $v_0$ of second paste is 1.05 or more, the first paste being prepared by kneading composite carbon fiber aggregates with a liquid medium, the composite carbon fiber aggregates comprising the multi-walled carbon nanotubes, the graphitized carbon nanofibers and the carbon particles; the second paste being prepared by kneading a composition with a liquid medium, the composition being prepared by mixing the multi-walled carbon nanotubes, the graphitized carbon nanofibers and the carbon particles in the same mass ratio by dry process.

8. A battery electrode, comprising the composite carbon fibers according to of claim 1.

9. A battery electrode, comprising the composite carbon fiber aggregates according to claim 5.

10. The composite carbon fibers according to claim 1, wherein the multi-walled carbon nanotubes have a tubular structure in which graphene sheets comprising carbon six membered rings are rolled in parallel to the fiber axis.

11. A method for producing the composite carbon fibers according to claim 1, the method comprising:
    mixing multi-walled carbon nanotubes in which 99% by number or more of the multi-walled carbon nanotubes have a fiber diameter of not less than 5 nm and not more than 40 nm, carbon particles having a primary particle diameter of not less than 20 nm and not more than 100 nm, graphitized carbon nanofibers in which 99% by number or more of the graphitized carbon nanofibers have a fiber diameter of not less than 50 nm and not more than 300 nm, and a solvent to obtain a mixture,
    injecting the mixture into a grinding nozzle of a high-pressure dispersing device under a pressure of from 100 MPa to 250 MPa to obtain a slurry or paste, and
    drying the slurry or paste for powderization.

12. The composite carbon fibers according to claim 1, comprising no electrode active materials.

13. The composite carbon fibers according to claim 1, comprising no dispersing agents.

14. The composite carbon fibers according to claim 1, having a function as an electrical conductivity imparting agent.

15. The composite carbon fibers according to claim 1, of which the water content is 0.5% by mass or less.

16. The composite carbon fibers according to claim 1, being in the form of a dried powder.

17. The composite carbon fibers according to claim 1, being in the form of a paste, wherein a viscosity ratio ($v/v_0$) of the viscosity v of first paste to the viscosity $v_0$ of second paste is 1.05 or more, the first paste being prepared by kneading an aggregates of the composite carbon fiber with a liquid medium, the second paste being prepared by kneading a composition with liquid medium, the composition being prepared by mixing the multi-walled carbon nanotubes, the graphitized carbon nanofibers and the carbon particles in the same mass ratio by dry process.

18. A positive or negative electrode for battery, the electrode comprising the composite carbon fibers according to claim 1, a positive or negative electrode active material and a binder.

* * * * *